United States Patent [19]

Jung

[11] Patent Number: 5,109,284
[45] Date of Patent: Apr. 28, 1992

[54] APPARATUS FOR CONTROLLING THE OPERATION OF A TELEVISION ACCORDING TO THE CONTROL SIGNAL OF A VIDEO CASSETTE RECORDER AND A METHOD THEREFOR

[75] Inventor: Tae-Hong Jung, Seoul, Rep. of Korea

[73] Assignee: SamSung Electronics Co., Ltd., Suwon, Rep. of Korea

[21] Appl. No.: 404,562

[22] Filed: Sep. 8, 1989

[30] Foreign Application Priority Data

Apr. 11, 1988 [KR] Rep. of Korea ......... 1988-14505[U]

[51] Int. Cl.$^5$ ............................................ H04N 5/782
[52] U.S. Cl. .................................. 358/335; 358/181; 358/194.1; 360/79
[58] Field of Search .................... 358/335, 194.1, 906, 358/181; 360/79, 33.1, 35.1

[56] References Cited

U.S. PATENT DOCUMENTS

| | | |
|---|---|---|
| 4,392,022 | 7/1983 | Carlson ............................ 358/194.1 |
| 4,626,848 | 12/1986 | Ehlers ............................... 358/194.1 |
| 4,633,514 | 12/1986 | Fimoff et al. .................... 358/194.1 |
| 4,771,283 | 9/1988 | Imoto ................................ 358/194.1 |
| 4,860,202 | 8/1989 | Jones ................................ 358/194.1 |

OTHER PUBLICATIONS

KS5803A/KS5803B CMOS Integrated Circuit; Samsung; Linear IC Data Book vol. 1, pp. 527–533, 1988.

Primary Examiner—Roy N. Envall, Jr.
Assistant Examiner—Huy Nguyen
Attorney, Agent, or Firm—Robert E. Bushnell

[57] ABSTRACT

The present invention is to provide an apparatus for turning on/off a TV and switching the input source thereof by means of a Video Cassette Recorder (VCR) without separately turning on/off the TV and VCR when playing the VCR. The TV control signal generated by a first microcomputer of the VCR is combined with the audio signal of the VCR by an adder, from which a combined signal is transmitted through an audio line to the external input terminal. In the TV, the combined signal is low-pass-filtered to detect the audio signal, while being high-pass-filtered to detect the TV control signal applied to a microcomputer of the TV to turn on the TV or switch the input source thereof.

20 Claims, 2 Drawing Sheets

APPARATUS FOR CONTROLLING THE OPERATION OF A TELEVISION ACCORDING TO THE CONTROL SIGNAL OF A VIDEO CASSETTE RECORDER AND A METHOD THEREFOR

BACKGROUND OF THE INVENTION

The present invention concerns a circuit for automatically controlling the operation of a Television (TV) according to the control signal of a video cassette recorder (VCR) and a method therefor.

Conventionally, when the VCR is to be played, the TV and the VCR must be separately operated. Thus, when the on/off time of the VCR is to be predestined, it is natural that the VCR and the TV must be separately operated. This is an unavoidable problem resulting from the fact that there is no information communication means between the TV and the VCR.

SUMMARY OF THE INVENTION

An object of the present invention is to provide an apparatus which causes a TV to be automatically operated according to control signal of the VCR and a method therefor.

In accordance with an aspect of the present invention, the apparatus for controlling the operation of a TV according to the control signal of the VCR contemplates: a first microcomputer installed in the VCR; a second microcomputer installed in the TV, the TV also having a remote controlling receiver; an adder for combining the audio signal produced from an audio signal output means and the TV control signal produced from the first microcomputer, the combined signal being transmitted through the audio line of the VCR; a low pass filter for detecting the audio signal from the combined signal; and a high pass filter for detecting the TV control signal from the combined signal, said apparatus characterizing in that the audio signal detected by the low pass filter and the TV control signal detected by the high pass filter are respectively inputted into the audio/video switch of the TV and the second microcomputer.

BRIEF DESCRIPTION OF THE ATTACHED DRAWINGS

For a better understanding of the invention and to show how the same may be carried into effect, reference will now be made, by way of example, to the accompanying diagrammatic drawings, in which:

FIG. 1 illustrates the inventive system; and
FIG. 2 is a flow-chart of the present invention.

DETAILED DESCRIPTION OF THE PREFERRED EMBODIMENT

The present invention will now be described more specifically with reference to the drawings attached only by way of example.

Figure 1:
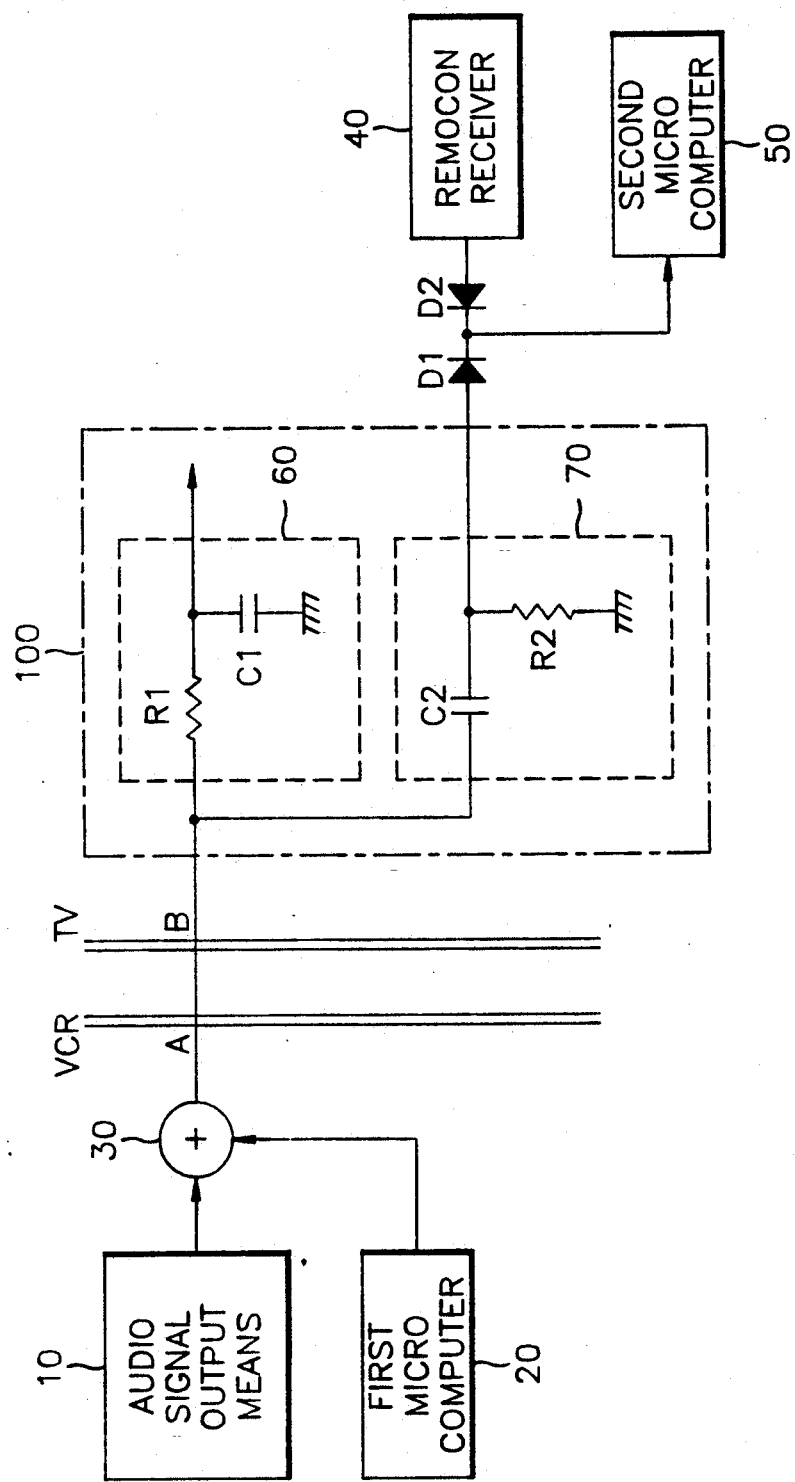

Referring to FIG. 1, the VCR comprises an audio signal output stage 10 for generating audio signals, first microcomputer 20, and an adder 30 for combining the audio signal produced from the audio signal output stage and the TV control signal of infrared ray (IR) produced from the first microcomputer 20. The TV is controlled by the second microcomputer 50. A signal separator 100 comprises a low pass filter 60 and a high pass filter 70, receiving the combined signal produced from the adder 30. The low pass filter 60 comprises a resistor R1 and a condenser C1, and separates from the combined signal the audio signal which is then transmitted to the audio/video switch (not shown) of the TV. Likewise, the high pass filter 70 comprises a condenser C2 and a resistor R2, and separates from the combined signal the IR signal which is then transmitted to the second microcomputer 50 of the TV.

The operation of the inventive system will now be more specifically described.

The first microcomputer 20 generates the IR signal as the TV control signal according to the format of the remote control of the TV. The IR signal is combined with the audio signal from the audio signal output stage 10 by the adder 30 which outputs the signal through the audio output terminal A of the VCR.

The combined signal is input through the external audio signal input terminal B of the TV into the signal separator 100, thereby being separated into the audio signal lower than 20 KHz and the IR signal higher than 30 KHz respectively through the low pass filter 60 comprising the resistor R1 and the condenser C1 and the high pass filter 70 comprising the resistor R2 and the condenser C2. The audio signal is delivered to the audio/video switch, while the IR signal is input through the diode D1 into the second microcomputer 50 of the TV, thereby being decoded. On the other hand, the IR signal generated by the remote controlling receiver may be transmitted through the diode D2 to the second microcomputer 50.

Figure 2:
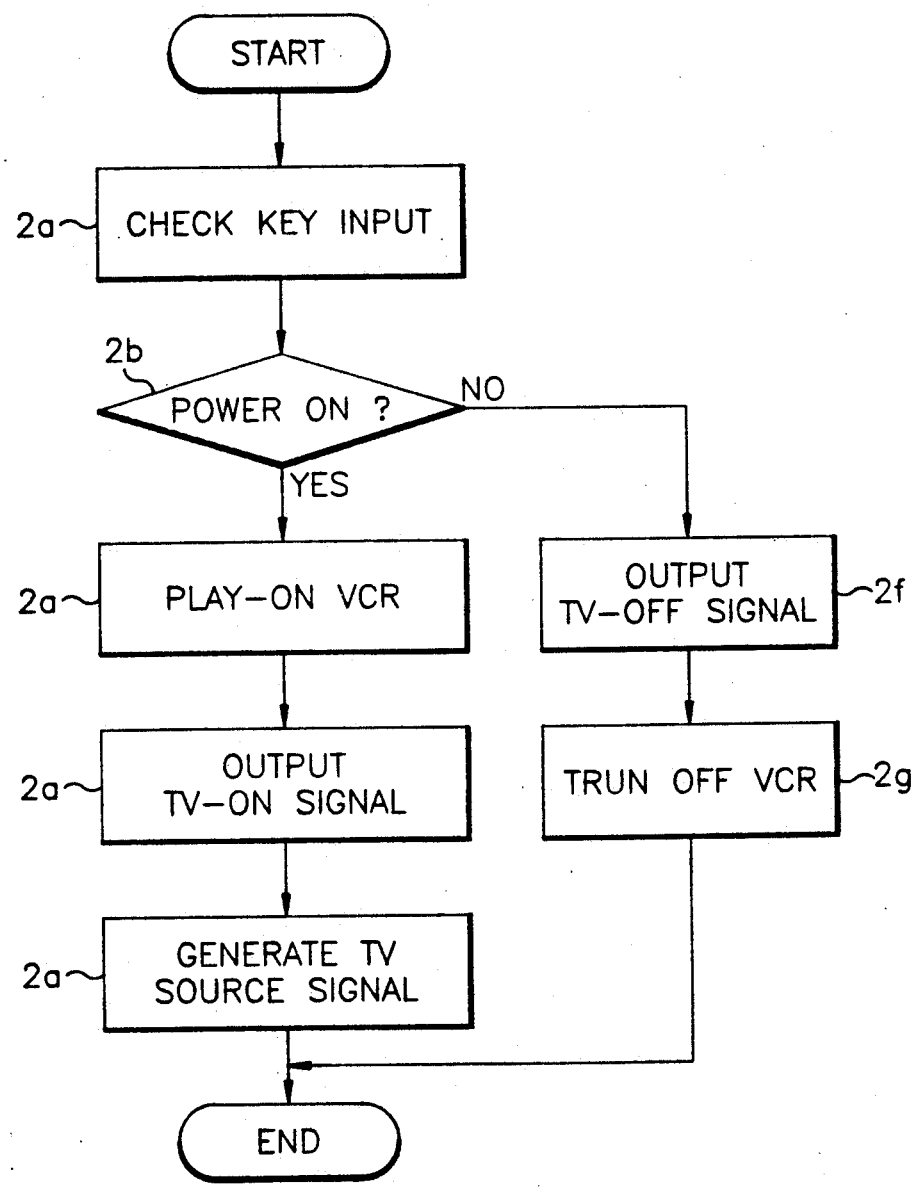

The operation steps of the inventive system will now be described more specifically with reference to the flow-chart of FIG. 2.

The first microcomputer 20 checks the remote controlling key input in step 2a, and perceives in step 2b whether the power is on or not. The first microcomputer 20 controls the play-on operation of the VCR in step 2c when the power is on in the step 2b.

In step 2d, the first microcomputer 20 outputs the data signal for turning on the TV through the output port A of the VCR. The data signal of an infrared ray is combined with the audio signal by the adder 30, and input through the audio line into the TV. The data signal is input through the high pass filter 70 comprising the condenser C2 and the resistor R2, and the diode D1 into the input terminal of the second microcomputer 50. The microcomputer 50 decodes the inputted signal to turn on the relay for supplying the TV with power.

In step 2e, the first microcomputer 20 generates the data signal of IR for switching the input source of the TV, which is transmitted through the audio line and thereafter the IR signal generated from the first microcomputer 20 controls the TV to switch the input source of the TV to that of the VCR mode, thereby displaying a signal from the VCR. If the power is not on in the step 2b, the first microcomputer 20 generates the data signal for turning off the TV in step 2f. The data signal for turning off the TV is, as described above, combined with the audio signal by the adder 30, transmitted through the audio line to the signal separating means 100. The data signal separated by the separating means 100 causes the second microcomputer 50 to turn off the TV. Thereafter, in step 2g, the first microcomputer 20 is operated to turn off the VCR.

As described above, the present invention provides the means for simultaneously operating the VCR and the TV by using the audio line for transmitting the data signal to control the TV from the VCR, so that no additional line is required for the additional inventive function, thereby simplifying the circuit construction. Of course, it is well understood that to predestine the on/off time of the VCR is to simultaneously control the TV, so that it is not necessary to separately turn on/off the TV.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An apparatus for controlling the operation of a television according to a control signal of a video cassette recorder, comprising:

a first microcomputer installed in said video cassette recorder;

a second microcomputer installed in said television, said television also having a remote controlling receiver for providing infrared control signals to said second microcomputer;

an adder for combining an audio signal produced from an audio signal output means and a television control signal produced from the first microcomputer and for producing a combined signal, the combined signal being transmitted through an audio line of said video cassette recorder;

a low pass filter for separating said audio signal from said combined signal; and p1 a high pass filter for separating the television control signal from said combined signal;

said apparatus characterized in that said audio signal separated by said low pass filter and said television control signal separated by said high pass filter are respectively input into an audio/video switch of said television and said second microcomputer, wherein said second microcomputer controls a function of said television in response to said television control signal.

2. The apparatus as claimed in claim 1, wherein said low pass filter comprises a resistor R1 and a condenser C1 connected in series between said adder and ground, and said audio/video switch is connected to the junction point of said resistor R1 and said condenser C1.

3. The apparatus as claimed in claim 1, wherein said high pass filter comprises a condenser C2 and a resistor R2 connected in series between said adder 30 and ground, and an input terminal of said second microcomputer is connected to the junction point of said condenser C2 and said resistor R2 via a first diode.

4. The apparatus as claimed in claim 1, also comprising the first diode connected forwardly towards the infrared ray input terminal of said second microcomputer from the output terminal of said high pass filter, and a second diode connected forwardly towards said input terminal from the output terminal of said remote controlling receiver.

5. A method for controlling operation of a television according a control signal from a first microcomputer of a video cassette recorder, said television comprising a second microcomputer, a high pass filter and a low pass filter, said video cassette recorder comprising an audio signal output means and an adder, said method comprising the steps of:

checking a key input of said first microcomputer and determining whether power to said video cassette recorder is on or not;

turning on a play mode of said video cassette recorder when the power is determined to be on and outputting, from said first microcomputer, a television-on signal;

combining said television-on signal and an audio signal produced from said audio signal output means to produce a combined signal;

providing said combined signal to said television; and low-pass-filtering said combined signal to feed the audio signal to an audio/video switch of said television and high-pass-filtering said combined signal to feed said television-on signal to said second microcomputer so as to turn on said television.

6. The method as claimed in claim 5, further comprising the steps of:

outputting a television-off signal from said first microcomputer when said power is determined to be off and turning said video cassette recorder off;

combining said television-off signal and said audio signal to produced a combined signal;

providing said combined signal to said television; and low-pass filtering said combined signal to feed the audio signal to said audio/video switch of said television and high-pass-filtering said combined signal to feed said television-off signal to said second microcomputer so as to turn off said television.

7. The method as claimed in claim 5, further comprising the step of:

generating, from said first microcomputer, a television-source signal and outputting said television-source signal after said play mode has been turned on and said television-on signal has been output;

combining said television-source signal and said audio signal to produced a further combined signal;

providing said further combined signal to said television; and low-pass-filtering said further combined signal to feed the audio signal to said audio/video switch of said television and high-pass-filtering said further combined signal to feed said television-source signal to said second microcomputer so as to cause said television to display an output signal of said video cassette recorder.

8. The apparatus as in claim in claim 1, wherein said low pass filter has an upper band limit of 20 KHz.

9. The apparatus as claimed in claim 1, wherein said high pass filter has a low band limit of 30 KHz.

10. The apparatus as claimed in claim 1, wherein said television control signal has a frequency corresponding to a response frequency of said remote controlling receiver; and said function of said television controlled by said television control signal comprises turning said television on, turning said television off, or controlling said television to receive signals for display from said video cassette recorder.

11. An apparatus for controlling the operation of a television receiver according to a control signal of a video cassette recorder, comprising:

first control means installed in said video cassette recorder, for generating a television control signal;

remote control means installed in the television, for providing remote control signals;

means for providing via an audio line coupling the video cassette recorder and the television, a combined signal by combining an audio signal and said television control signal;

means for separating said audio signal from said combined signal, and for separating the television control signal from said combined signal; and third control means installed within the television, for controlling functions of the television in response to said television control signal separated from said combined signal and in response to said remote control signals.

12. The apparatus of claim 11, further comprised of said first control means generating said television control signals to switch the television to a video cassette recorder mode enabling the television to display signals received from the video cassette recorder.

13. The apparatus of claim 11, further comprised of said first control means generating said television signals to switch the television to an OFF state.

14. The apparatus of claim 11, further comprised of said first control means determining whether electrical power is in an ON state, and then, if the electrical power is in an ON state, generating said television control signals to switch the television to a video cassette recorder mode enabling the television to display signals received from the video cassette recorder.

15. The apparatus of claim 11, further comprised of said means for providing said combined signal, providing said combined signal with said audio signal exhibiting a first frequency band and said television control signal exhibiting a second frequency band different from said first frequency band.

16. The apparatus of claim 11, further comprised of:
said means for providing said combined signal, providing said combined signal with said audio signal exhibiting a first frequency band and said television control signal exhibiting a second frequency band different from said frequency band; and
said separating means comprising:
a first filter exhibiting a passband coinciding with said first frequency band; and
a second filter exhibiting a passband coinciding with said second frequency band.

17. The apparatus of claim 12, further comprised of:
said means for providing said combined signal, providing said combined signal with said audio signal exhibiting a first frequency band and said television control signal exhibiting a second frequency band different from said first frequency band; and
said separating means comprising:
a first filter exhibiting a passband coinciding with said first frequency band; and
a second filter exhibiting a passband coinciding with said second frequency band.

18. The apparatus of claim 13, further comprised of:
said means for providing said combined signal, providing said combined signal with said audio signal exhibiting a first frequency band and said television control signal exhibiting a second frequency band different from said first frequency band; and
said separating means comprising:
a first filter exhibiting a passband coinciding with said first frequency band; and
a second filter exhibiting a passband coinciding with said second frequency band.

19. The apparatus of claim 14, further comprised of:
said means for providing said combined signal, providing said combined signal with said audio signal exhibiting a first frequency band and said television control signal exhibiting a second frequency band different from said first frequency band; and
said separating means comprising:
a first filter exhibiting a passband coinciding with said first frequency band; and
a second filter exhibiting a passband coinciding with said second frequency band.

20. The apparatus of claim 11, further comprised of:
said means for providing said combined signal, providing said combined signal with said audio signal exhibiting a first frequency band and said television control signal exhibiting a second frequency band different and separated from, said first frequency band; and
said separating means comprising:
a first filter exhibiting a passband coinciding with said first frequency band; and
a second filter exhibiting a passband coinciding with said second frequency band.

* * * * *

UNITED STATES PATENT AND TRADEMARK OFFICE
CERTIFICATE OF CORRECTION

PATENT NO. : 5,109,284
DATED : 28 April 1992
INVENTOR(S) : Tae-Hong JUNG

It is certified that error appears in the above-identified patent and that said Letters Patent is hereby corrected as shown below:

Column 1, Line 9, replace "Television" with --television--;

Line 14, replace "predestine" with --predetermined--;

Line 38, replace "characterizing" with --characterized--;

Column 3, Line 2, replace "predestined" with --predetermined--;

Claim 1, Column 3, Line 30, delete "p1", and create a new paragraph beginning with "a high";

Claim 5, Column 3, Line 60, insert --to-- after "according";

Claim 6, Column 4, Line 20, replace "produced" with --produce--;

Claim 7, Column 4, Line 35, replace "produced" with --produce--;

UNITED STATES PATENT AND TRADEMARK OFFICE
CERTIFICATE OF CORRECTION

PATENT NO. : 5,109,284

DATED : 28 April 1992

INVENTOR(S) : Tae-Hong JUNG

It is certified that error appears in the above-identified patent and that said Letters Patent is hereby corrected as shown below:

Claim 8, Column 4, Line 45, replace "in claim" (first occurrence) with --claimed--.

Signed and Sealed this

Sixth Day of July, 1993

Attest:

MICHAEL K. KIRK

*Attesting Officer*     Acting Commissioner of Patents and Trademarks